Jan. 17, 1950 W. G. PHELPS 2,494,831
TIRE PRESSURE SWITCH
Filed June 29, 1946
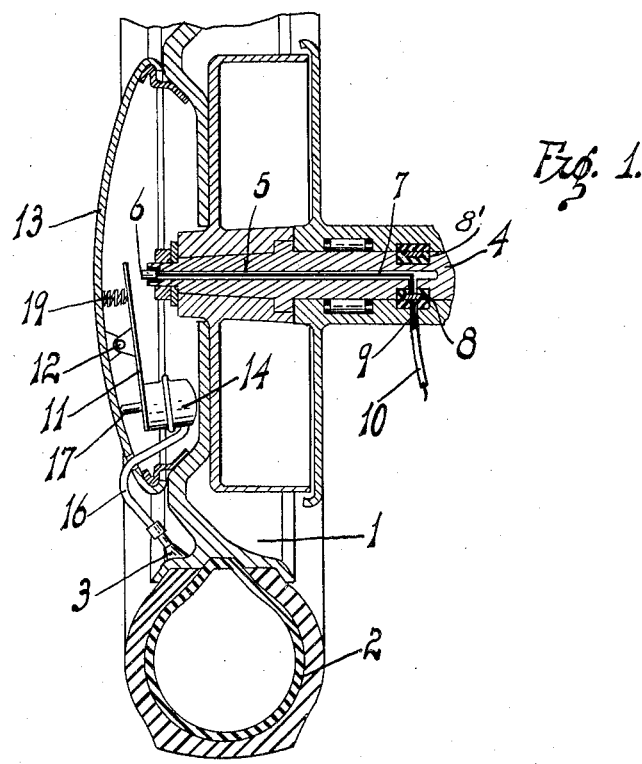
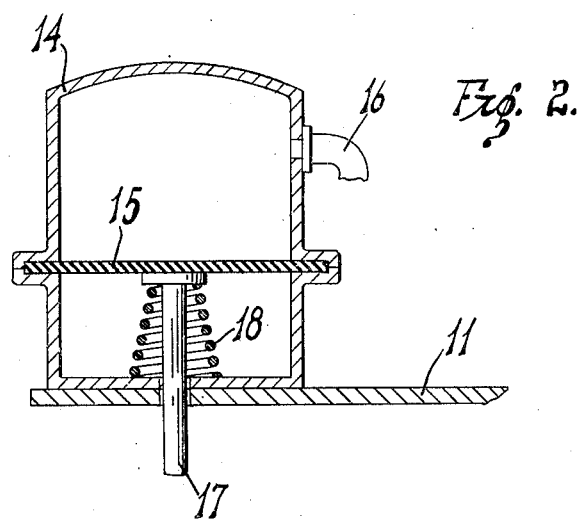
INVENTOR.
Willie G. Phelps.
BY
ATTORNEY.

Patented Jan. 17, 1950

2,494,831

UNITED STATES PATENT OFFICE 2,494,831

TIRE PRESSURE SWITCH

Willie G. Phelps, Long Beach, Calif.

Application June 29, 1946, Serial No. 680,351

2 Claims. (Cl. 200—58)

This invention relates to a tire pressure alarm, whereby the driver of a vehicle is warned if the pressure in any one of the tires of the vehicle is reduced to a dangerous point.

An object of my invention is to provide a novel tire pressure alarm in which the entire mechanism is mounted in the hub-cap, thus providing a structure which is easily mounted or dismounted from the wheels.

Another object of my invention is to provide a novel tire pressure alarm with a contact, the contact being mounted in and extending through the spindle of the drive shaft.

Another object of my invention is to provide a novel device of the character stated, which is simple in construction, inexpensive to manufacture and effective in operation.

A feature of my invention resides in the novel pressure diaphragm construction, wherein a post actuated by the pressure in the tire causes a contact finger to move into or out of engagement with a contact.

Other objects, advantages and features of invention may appear from the accompanying drawing, the subjoined detailed description and the appended claims.

In the drawing:

Figure 1 is a fragmentary transverse sectional view of a vehicle wheel with my tire alarm mounted thereon.

Figure 2 is a transverse sectional view of the diaphragm member.

Referring more particularly to the drawing, the numeral 1 indicates a vehicle wheel which is of usual and well known construction. The usual tire 2 is mounted on this wheel and again this tire is of usual and well known construction, including an air nipple 3, which extends into the inner tube of the tire. The wheel 1 is mounted on the shaft or spindle 4, as is usual in the construction of a vehicle.

The shaft or spindle 4 is drilled as shown at 5, and a contact 6 insulated from the shaft is mounted at the outer end of this drill passage, and an insulated conduit 7 extends from the contact 6 to a contact ring 8, and this ring in turn is engaged by a brush 9, from which a lead 10 extends, the lead 10 extends to a light or other alarm on the dash board of the vehicle. If the part 4 shall be a spindle, then the wire or conduit 7 extends direct from the contact 6 to the light or other alarm on the dash. The contact ring 8 is insulated from the shaft 4 in the usual manner, by insulation 8'.

A contact arm 11 is pivotally mounted at 12 to the hub cap 13. A cylinder 14 is fixedly mounted on one end of the contact arm 11 and a flexible diaphragm 15 is mounted in the cylinder 14 and extends transversely. A tube 16 extends from the nipple 3 to the upper end of the cylinder 14, thus connecting the tire 2 and one side of the diaphragm 5, thus making this diaphragm responsive to the pressure in the tire.

A pin 17 is attached to the diaphragm 5 and extends out of the cylinder 14. This pin bears against the hub cap 13, and causes the contact arm 11 to swing on its pivot 12, as the pressure on the upper side of the diaphragm 15 varies. A spring 18 bears against the bottom of the diaphragm 15, tending to force this diaphragm upwardly and tending to retract the pin 17.

A spring 19 bears against the arm 11 and tends to swing this arm into engagement with the contact 6. When the pressure in the tire 2 is normal, the diaphragm 15 will be somewhat distended, thus pressing the pin 17 against the hub cap 13, and swinging the contact end of the arm 11 away from the contact 6. Now, if the pressure, in the tire, is reduced, the spring 18 will withdraw the pin 17, thus permitting the arm 11 to swing on its pivot 12, and the spring 19 will force this arm against the contact 6, thus completing the circuit and causing a light or other alarm on the dash to be actuated.

In operation, when the pressure in the tire 2 decreases, the tension of the spring 18 will urge the pin 17 inwardly of the cylinder 14, thus causing the arm 11 to tilt on its pivot under the pressure of the spring 19, until this arm engages the contact 6. Engagement of the contact 6 completes the ground circuit in an automobile, causing the light or other signal to which the wire 10 extends to be operated. The electrical contacting method here recited is exactly the same as the horn button on the modern automobile.

Having described my invention, I claim:

1. A tire pressure alarm for pneumatic tires, including a hub cap, the alarm comprising a cylinder, a contact arm extending laterally from the cylinder, means pivotally mounting the contact arm on the hub cap, a pin projecting from the cylinder and engaging the hub cap, a pneumatic conduit extending from the tire into the cylinder whereby tire pressure is exerted in the cylinder, the tire pressure urging the pin against the hub cap, said cylinder moving on said pin with changes in tire pressure in the cylinder, an electrical contact on the shaft on which the tire is mounted, said contact arm being adapted and arranged to engage the electrical contact when swung on its pivot means, and a spring engaging said arm to urge the pin against the hub cap, a flexible diaphragm positioned transversely in the cylinder, said pin being mounted on the diaphragm and projecting from the cylinder to engage the hub cap.

2. A tire pressure alarm for pneumatic tires, including a hub cap, the alarm comprising a cylinder, a contact arm extending laterally from the cylinder, means pivotally mounting the contact arm on the hub cap, a pin projecting from the cylinder and engaging the hub cap, a pneumatic conduit extending from the tire into the cylinder whereby tire pressure is exerted in the cylinder, the tire pressure urging the pin against the hub cap, said cylinder moving on said pin with changes in tire pressure in the cylinder, an electrical contact on the shaft on which the tire is mounted, said contact arm being adapted and arranged to engage the electrical contact when swung on its pivot means, and a spring engaging said arm to urge the pin against the hub cap, a flexible diaphragm positioned transversely in the cylinder, said pin being mounted on the diaphragm and projecting from the cylinder to engage the hub cap, and a spring in the cylinder engaging the pin and urging said pin into the cylinder.

WILLIE G. PHELPS.

REFERENCES CITED

The following references are of record in the file of this patent:

UNITED STATES PATENTS

| Number | Name | Date |
|---|---|---|
| 2,033,424 | Gieskieng | Mar. 10, 1936 |
| 2,082,341 | Kelley | June 1, 1937 |
| 2,308,372 | Krantz | Jan. 12, 1943 |